(12) United States Patent
Zhou et al.

(10) Patent No.: US 8,098,498 B2
(45) Date of Patent: Jan. 17, 2012

(54) SELF-POWERED PORTABLE ELECTRONIC DEVICE

(75) Inventors: Yu-Hui Zhou, Shenzhen (CN); Xiao-Bing Liu, Shenzhen (CN); Juan-Rong Wu, ShenZhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 304 days.

(21) Appl. No.: 12/534,952

(22) Filed: Aug. 4, 2009

(65) Prior Publication Data

US 2010/0046180 A1    Feb. 25, 2010

(30) Foreign Application Priority Data

Aug. 19, 2008  (CN) .............................. 200810304039

(51) Int. Cl.
*H05K 7/02* (2006.01)

(52) U.S. Cl. ...................................................... 361/807
(58) Field of Classification Search .................. 361/807, 361/679.3, 679.55, 679.56, 727; 455/572–574, 455/575.1, 575.4; 312/223.1, 223.2
See application file for complete search history.

(56) References Cited

U.S. PATENT DOCUMENTS

2009/0212675 A1* 8/2009 Zhang et al. .................. 312/237
* cited by examiner

*Primary Examiner* — Jeremy Norris
*Assistant Examiner* — Tremesha S Willis
(74) *Attorney, Agent, or Firm* — Altis Law Group, Inc.

(57) ABSTRACT

A self-powered portable electronic device includes a main body, a cover slidably assembled on the main body, a sliding part secured on the cover, and a power generating device. The power generating device includes a rack secured on the sliding part, a power generating module assembled on the main body, and a gear engaging the rack and assembled on the power generating module. The cover slides the rack relative to the main body, and the gear is rotated by the rack and drives the power generating module to generate operating power.

15 Claims, 6 Drawing Sheets

United States Patent US 8,098,498 B2

SELF-POWERED PORTABLE ELECTRONIC DEVICE

BACKGROUND

1. Technical Field

The present disclosure relates to portable electronic devices, and, particularly, to a self-powered portable electronic device.

2. Description of Related Art

Portable electronic devices such as mobile phones and personal digital assistants (PDAs) are widely used. A portable electronic device often includes a battery to provide power required for operation.

When the battery is exhausted, it can often be recharged by auxiliary power generating equipment, requiring that the charging equipment accompany the device, compromising portability.

Therefore, there is room for improvement within the art.

BRIEF DESCRIPTION OF THE DRAWINGS

Many aspects of a self-powered portable electronic device can be better understood with reference to the following drawings. The components in the drawings are not necessarily to scale, the emphasis instead being placed upon clearly illustrating the principles of the present self-powered portable electronic device. Moreover, in the drawings, like reference numerals designate corresponding parts throughout the several views.

DETAILED DESCRIPTION OF THE EMBODIMENTS

Figure 1:
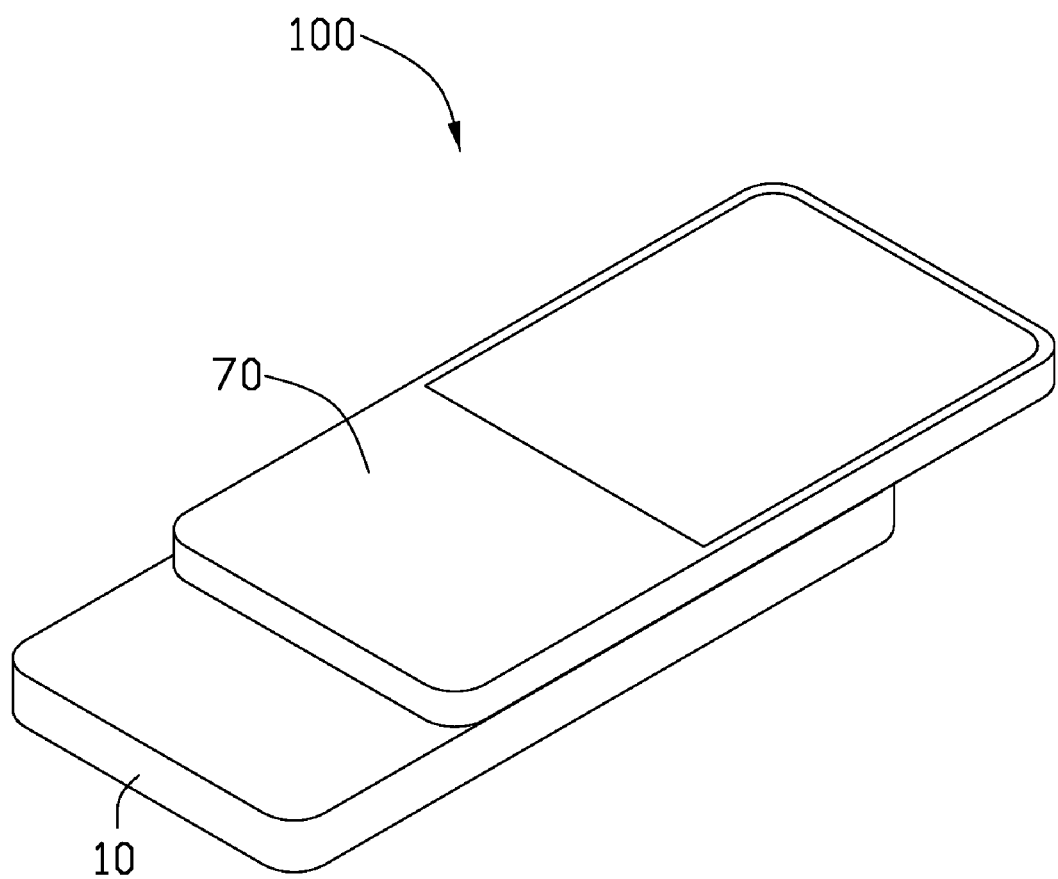
FIG. 1 is a perspective view of a self-powered portable electronic device according to an exemplary embodiment.
Figure 2:
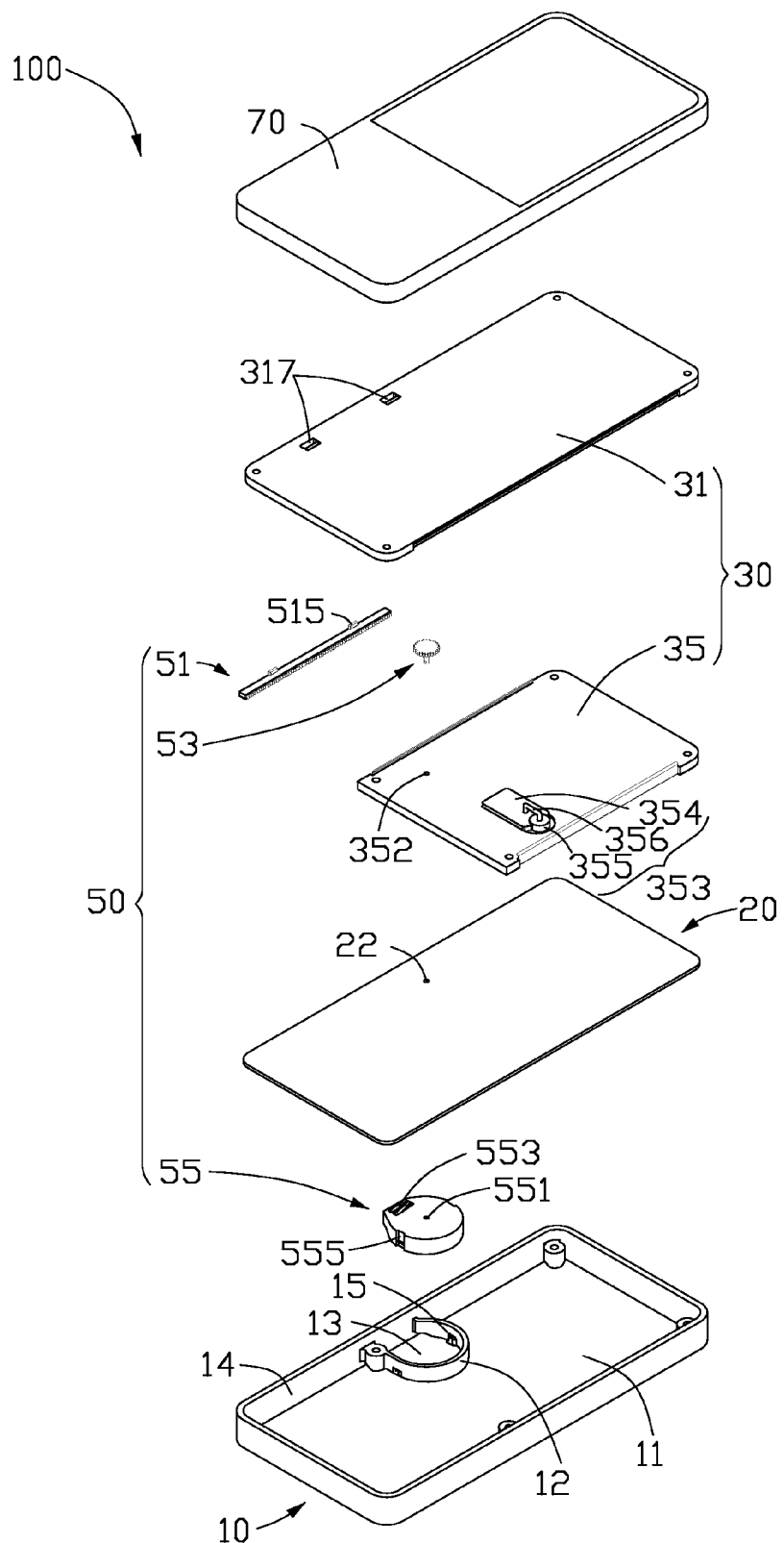
FIG. 2 is an exploded, perspective view of the self-powered portable electronic device of FIG. 1.
Figure 3:
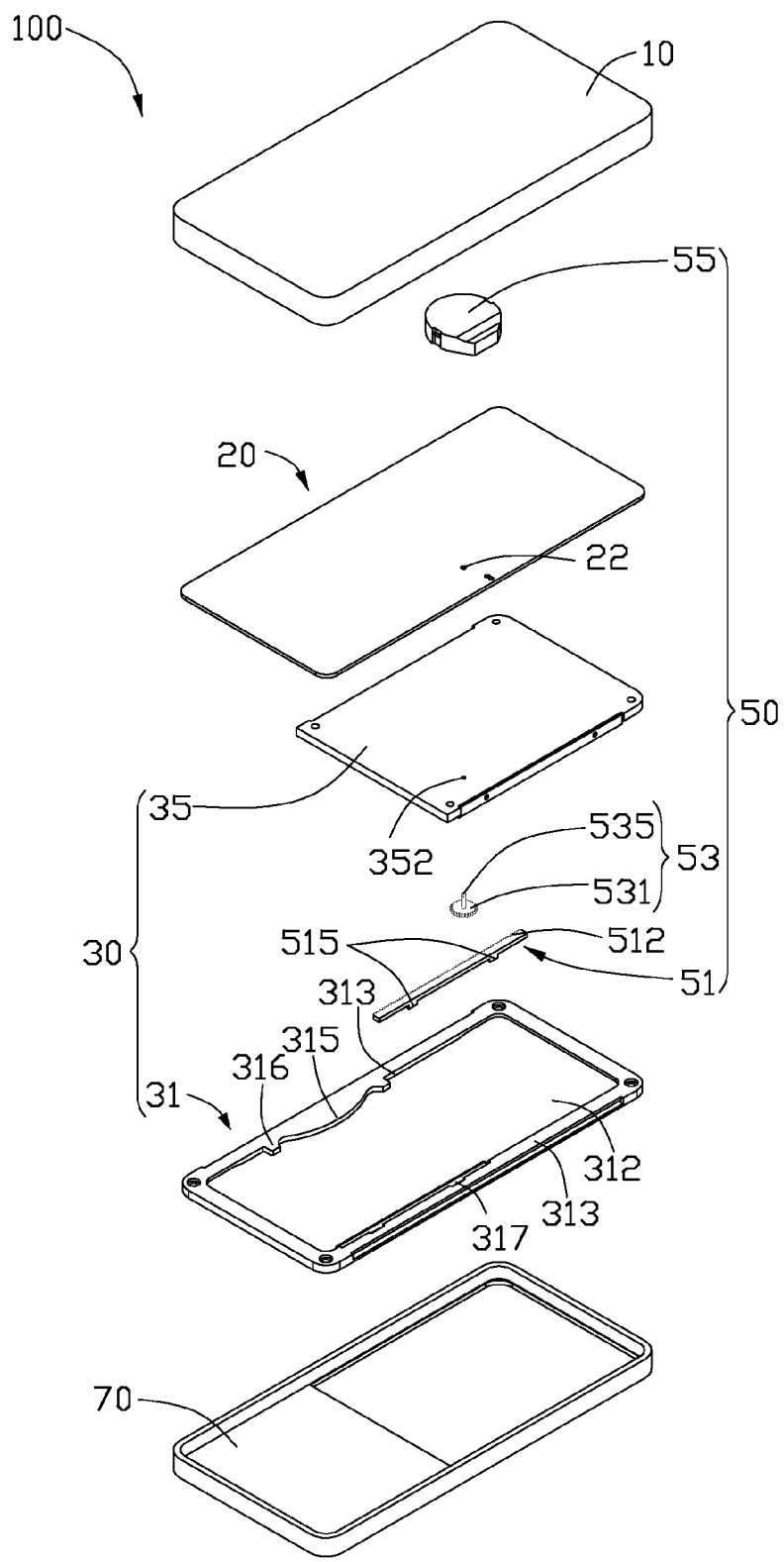
FIG. 3 is similar to FIG. 2, but viewed from another angle.

Referring to the drawings, FIG. 1 through FIG. 3 show a self-powered portable electronic device 100 including a main body 10, a printed circuit board 20, a slide mechanism 30, a power generating device 50, and a cover 70.

The main body 10 includes a bottom wall 11 and a sidewall 14 perpendicular to the bottom wall 11. The bottom wall 11 includes a curved peripheral wall 12 positioned thereon, connecting to the sidewall 14. The sidewall 14 and the peripheral wall 12 form a receiving chamber 13. The peripheral wall 12 includes two clasps 15 facing each other and received inside the receiving chamber 13.

The printed circuit board 20 can be assembled to the main body 10. The printed circuit board 20 includes a first through hole 22 aligned above the receiving chamber 13.

The slide mechanism 30 includes a sliding part 31 secured to the cover 70 and a stationary part 35 secured to the main body 10. The sliding part 31 can be slidable relative to the stationary part 35. The sliding part 31 defines a recess 312 and two latching slots 317. The sliding part 31 includes two protruding walls 313 facing each other. One of the protruding walls 313 has a guiding wall 315 extending towards the other, and two latching portions 316 abuttingly positioned on the two sides of the guiding wall 315. For reasons described below, the guiding wall 315 is arc-shaped, a middle of the guiding wall 315 having a maximized thickness. The latching slots 317 are defined in the sliding part 31.

The stationary part 35 defines a second through hole 352 aligning with the first through hole 22. The stationary part 35 includes a sliding device 353. The sliding device 353 moves the sliding part 31 with respect to the stationary part 35. The sliding device 353 includes a base 354 secured to the stationary part 35, a roller 355, and a shaft 356 secured on the stationary part 35. The roller 355 rotates about the shaft 356.

The power generating device 50 can be assembled within the self-powered portable electronic device 100, providing operating power thereto. The power generating device 50 includes a rack 51, a gear 53, and a power generating module 55. The rack 51 is secured on the sliding part 31 including a plurality of cogs 512 laterally arranged, and two blocks 515 extend therefrom opposite to the cogs 512. The blocks 515 correspond to the latching slots 317. The gear 53 includes a gear portion 531 and a connecting shaft 535 secured at the center of the gear portion 531. The gear portion 531 slidably engages the rack 51. A free end of the connecting shaft 535 is secured to the power generating module 55 after passing through the second through hole 352 and the first through hole 22.

The power generating module 55 can be a typical brushless direct current microgenerator, including a stator and a rotor. The power generating module 55 is received in the receiving chamber 13 and electrically connects to the printed circuit board 20. The power generating module 55 includes a mounting hole 551, two resilient sheets 553, and two notches 555. The mounting hole 551 is defined in an upper wall of the power generating module 55, receiving the connecting shaft 535 therein for connection to the rotor. The resilient sheets 553 are fixed on the power generating module 55 adjacent to the mounting hole 551. The notches 555 are defined in a peripheral wall corresponding to the clasps 15 and configured for clasping the clasps 15 therein to secure the power generating module 55 in the receiving chamber 13.

The cover 70 can be secured to the sliding part 31, and slidably assembled with the main body 10.

Figure 4:
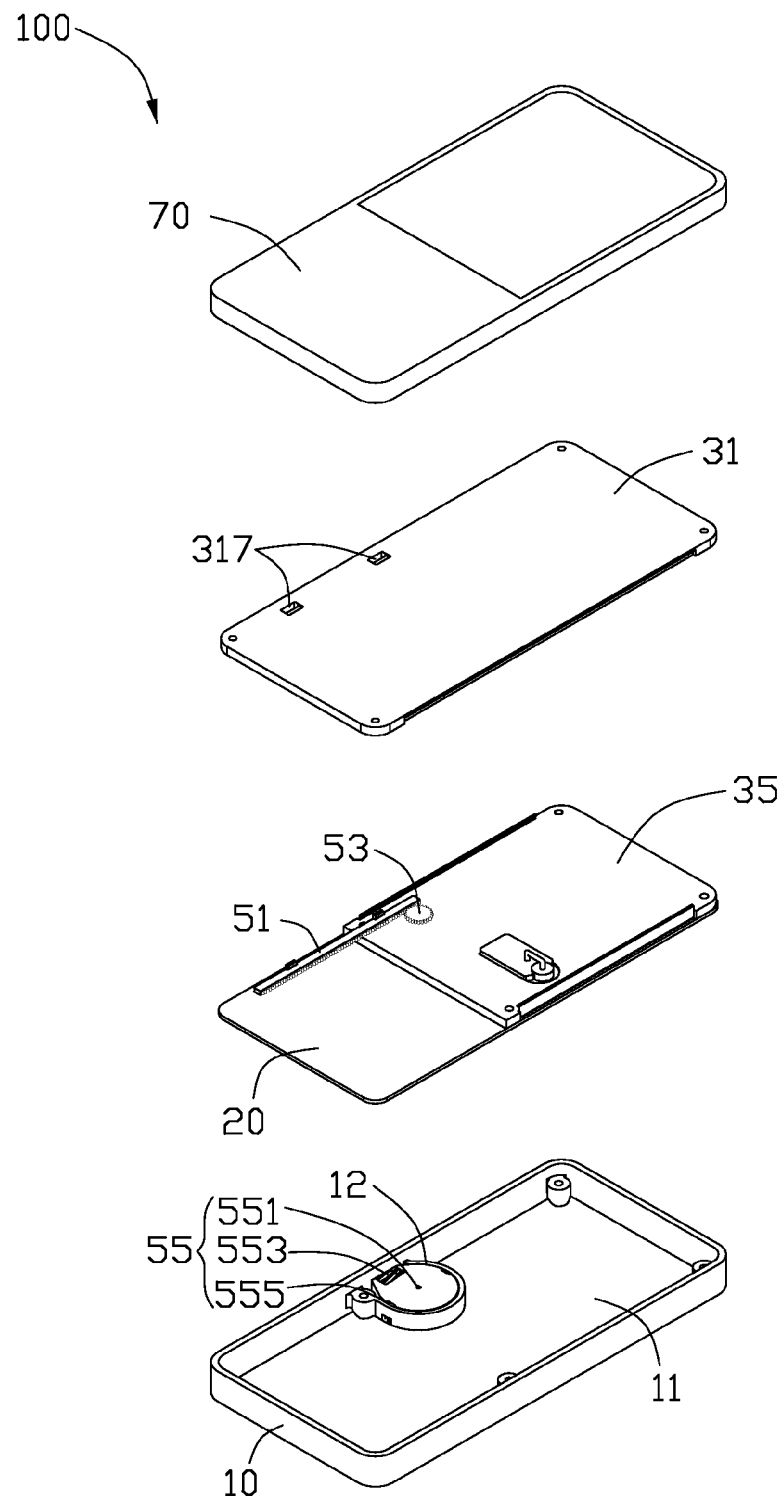
FIG. 4 is an assembled, perspective view of a power generating device of the self-powered portable electronic device of FIG. 1 installed on a printed circuit board.
Figure 5:
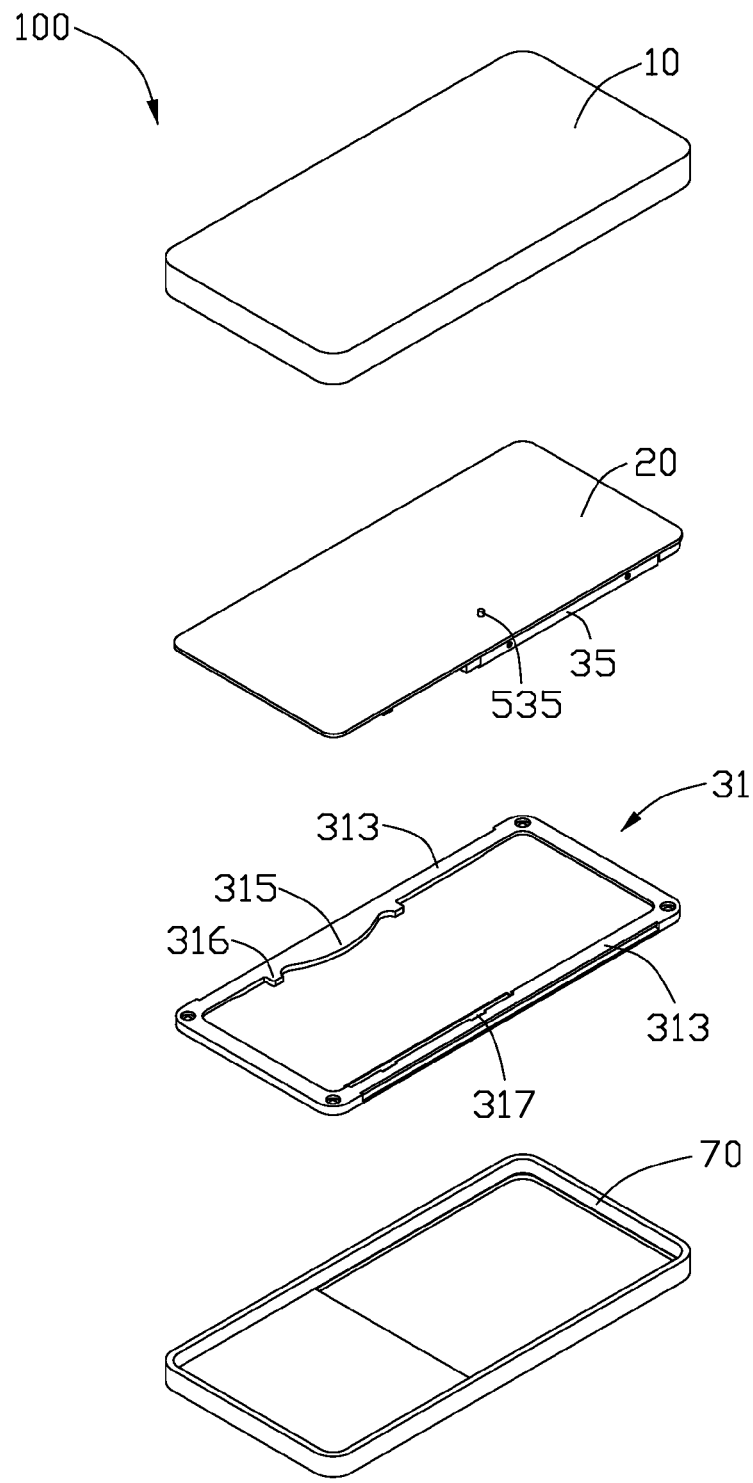
FIG. 5 is similar to FIG. 4, but viewed from another angle.
Figure 6:
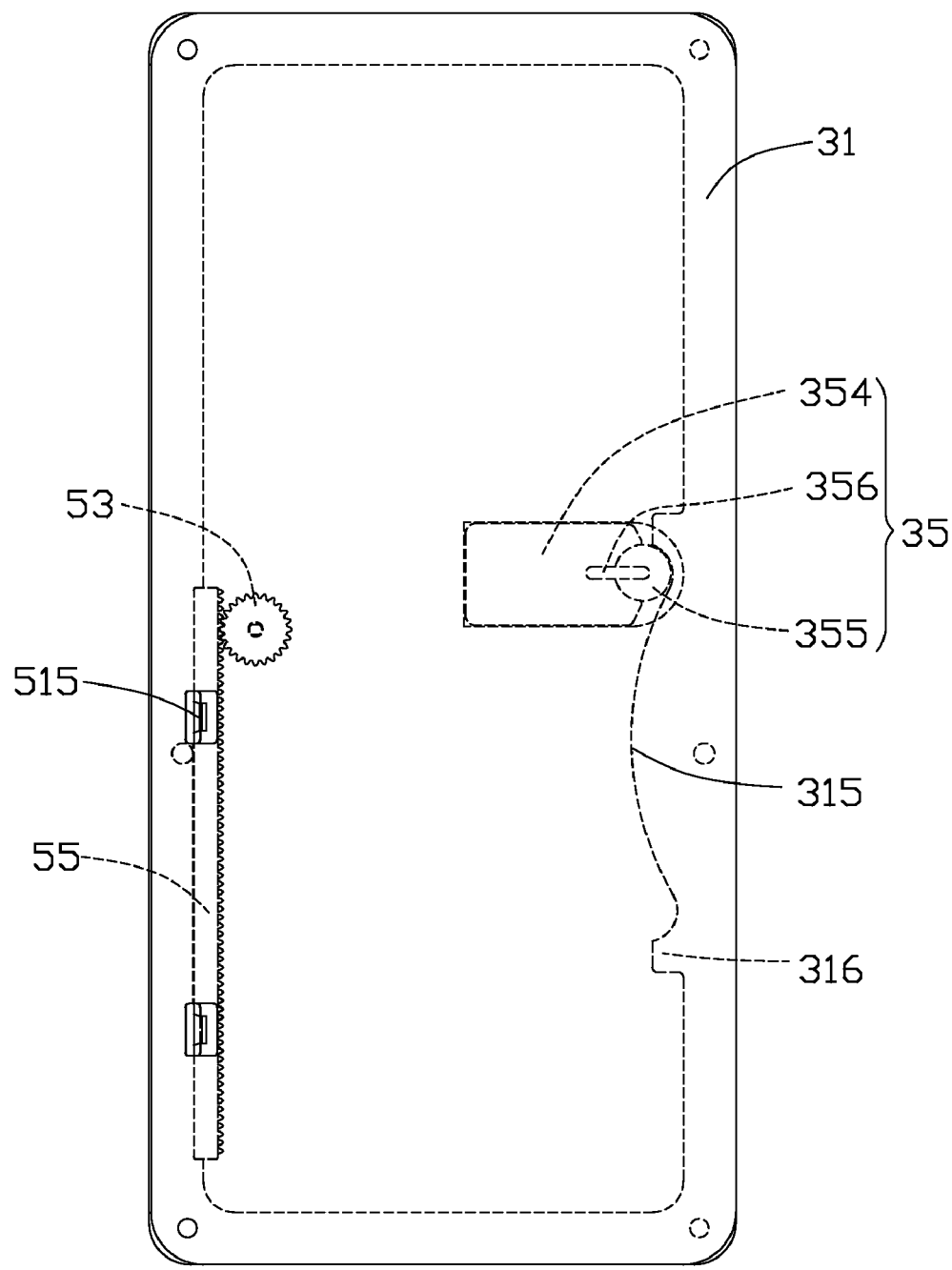
FIG. 6 is a top plan view of the power generating device of the self-powered portable electronic device of FIG. 1 assembled on a slide mechanism.

Referring to FIG. 4 through FIG. 6, during assembly, the power generating module 55 is secured in the receiving chamber 13 by engagement of the clasps 15 and the notches 555. The printed circuit board 20 is assembled on the main body 10 and electrically abuts the resilient sheets 553. The stationary part 35 is assembled on the main body 10. The cover 70 is assembled on the sliding part 31. The rack 51 is assembled on the sliding part 31 with the blocks 515 latched to the latching slots 317, and the cogs 512 facing the guiding wall 315. The connecting shaft 535 passes through the second through hole 352, the first through hole 22, and the mounting hole 551 and connects to the rotor of the power generating module 55. The rack 51 slidably engages the gear portion 531. The roller 355 resists the guiding wall 315. The sliding part 31 slides along the stationary part 35, and the roller 355 rolls along the guiding wall 315. When the roller 355 reaches the maximum thickness portion of the guiding wall 315, a spring (not shown) causes the roller 355 to automatically slide to the closed or opened position. The movement of the rack 51 rotates the gear portion 531 about the connecting shaft 535.

When a battery (not shown) of the self-powered portable electronic device 100 is exhausted, the cover 70 is slid relative to the main body 10 and the gear 53 is rotated. The connecting shaft 535 rotates the rotor relative to the stator, generating power. The power charges the battery to provide operating power to the self-powered portable electronic device 100.

It is to be understood that the slide mechanism 30 can be omitted, wherein the rack 51 is secured to the cover 70 and engages the gear 53. The gear 53 is assembled on the power generating module 55.

It is to be further understood that rack 51 can be omitted, wherein one of the protruding walls 313 defines a plurality of cogs engaging the gear 53.

It is to be also understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A self-powered portable electronic device, comprising:
    a main body;
    a cover slidably assembled on the main body;
    a sliding part secured on the cover;
    a power generating device, comprising:
    a rack secured on the sliding part;
    a power generating module assembled on the main body, the power generating module including a stator and a rotor; and
    a gear engaged with the rack and assembled on the power generating module;
    wherein the cover slides the rack relative to the main body, the gear is rotated by the rack and rotates the rotor relative to the stator, generating power for charging a battery of the self-powered portable electronic device.

2. The self-powered portable electronic device as claimed in claim 1, wherein the gear comprises a gear portion and a connecting shaft secured thereon secured in the power generating module, and the gear portion engages the rack.

3. The self-powered portable electronic device as claimed in claim 2, wherein the self-powered portable electronic device further comprises a stationary part secured on the main body on which the sliding part is slidable and through which the connecting shaft passes and is secured in the power generating module.

4. The self-powered portable electronic device as claimed in claim 3, wherein the sliding part defines two latching slots, and the rack comprises two blocks positioned thereon and latched thereto.

5. The self-powered portable electronic device as claimed in claim 4, wherein the main body comprises a sidewall and a curved peripheral wall surrounding a receiving chamber and further comprises a printed circuit board assembled on the main body, the printed circuit board defining a first through hole through which the connecting shaft passes and is secured in the power generating module.

6. The self-powered portable electronic device as claimed in claim 5, wherein the power generating module comprises two resilient sheets electronically connecting to the printed circuit board.

7. The self-powered portable electronic device as claimed in claim 6, wherein two clasps are formed on the curved peripheral wall and are positioned in the receiving chamber, and the power generating module defines two notches receiving the clasps.

8. The self-powered portable electronic device as claimed in claim 7, wherein the sliding part defines a recess to form two protruding walls facing each other, one of the protruding walls extends a guiding wall and two latching portions symmetrically positioned at two ends of the guiding wall.

9. The self-powered portable electronic device as claimed in claim 8, wherein the stationary part comprises a sliding device slidably assembling the sliding part on the stationary part.

10. The self-powered portable electronic device as claimed in claim 9, wherein the sliding device comprises a base positioned on the stationary part, a roller, and a shaft positioned on the stationary part, the roller rolling on the shaft.

11. A self-powered portable electronic device, comprising:
    a main body;
    a cover slidably assembled on the main body and defining a plurality of cogs;
    a power generating device, comprising:
    a power generating module mounted on the main body, the power generating module including a stator and a rotor; and
    a gear engaged with the cogs and assembled on the power generating module;
    wherein the gear is rotated by the cover and rotates the rotor relative to the stator, generating power for charging a battery of the self-powered portable electronic device.

12. The self-powered portable electronic device as claimed in claim 11, wherein the gear comprises a gear portion and a connecting shaft secured thereon secured in the power generating module, and the gear portion engages the cogs.

13. The self-powered portable electronic device as claimed in claim 12, wherein the main body comprises a sidewall and a curved peripheral wall surrounding a receiving chamber and further comprises a printed circuit board assembled on the main body, the printed circuit board defines a first through hole, and the connecting shaft passes through the first through hole and is secured in the power generating module.

14. The self-powered portable electronic device as claimed in claim 13, wherein the power generating module comprises two resilient sheets electronically connecting to the printed circuit board.

15. The self-powered portable electronic device as claimed in claim 13, wherein two clasps are formed on the curved peripheral wall and are positioned in the receiving chamber, the power generating module defines two notches receiving the clasps.

* * * * *